Figure 1:
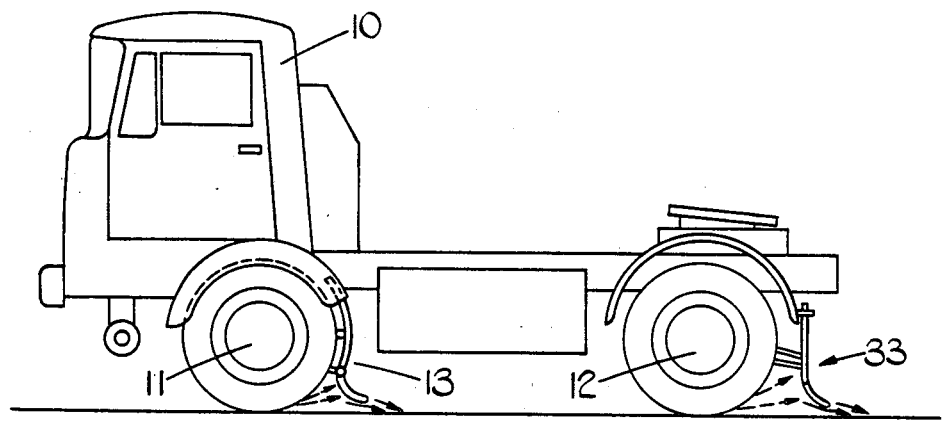

United States Patent [19]

Goodall

[11] 4,362,310
[45] Dec. 7, 1982

[54] SPRAY-INHIBITING MEANS FOR USE ON A ROAD VEHICLE

[75] Inventor: Maurice Goodall, Burton-upon-Trent, England

[73] Assignee: Maurice Goodall (Holdings) Limited, Staffordshire, England

[21] Appl. No.: 105,514

[22] Filed: Dec. 20, 1979

[30] Foreign Application Priority Data

Dec. 27, 1978 [GB] United Kingdom ............... 50004/78
Aug. 4, 1979 [GB] United Kingdom ............... 7927268
Aug. 11, 1979 [GB] United Kingdom ............... 7928041

[51] Int. Cl.³ .............................................. B62B 9/16
[52] U.S. Cl. ............................. 280/157; 280/154.5 R; 280/156
[58] Field of Search ................ 280/154.5 R, 154.5 A, 280/157, 156, 154, 152 R, 153 R

[56] References Cited

U.S. PATENT DOCUMENTS

| | | | |
|---|---|---|---|
| 1,779,331 | 10/1930 | Pollaert | 280/157 |
| 2,831,702 | 4/1922 | Eaves et al. | 280/154.5 R |
| 3,088,751 | 5/1963 | Barry et al. | 280/154.5 R |
| 3,198,545 | 8/1965 | McDaniel | 280/154.5 R |
| 3,341,222 | 9/1967 | Roberts | 280/154.5 R |
| 3,726,544 | 4/1973 | Miller | 280/154.5 R |

FOREIGN PATENT DOCUMENTS

| | | | |
|---|---|---|---|
| 493890 | 6/1950 | Belgium | 280/154.5 R |
| 447093 | 12/1912 | France | 280/157 |
| 568545 | 3/1924 | France | 280/157 |
| 635510 | 3/1928 | France | 280/157 |

*Primary Examiner*—Robert J. Spar
*Assistant Examiner*—Donald W. Underwood
*Attorney, Agent, or Firm*—Andrus, Sceales, Starke & Sawall

[57] ABSTRACT

This invention relates to spray-inhibiting means for a road vehicle, said means comprising a screen which in use is adapted to intercept water thrown rearwardly from a vehicle tire. The screen is mounted on the vehicle in use in an operative position in which its lower edge lies closely adjacent to the road surface behind the associated vehicle tire and the means for mounting the screen are arranged to maintain it in its operative position irrespective of the vertical position of the load carrying part of the vehicle (e.g. load supporting platform or body) relative to the road surface.

9 Claims, 11 Drawing Figures

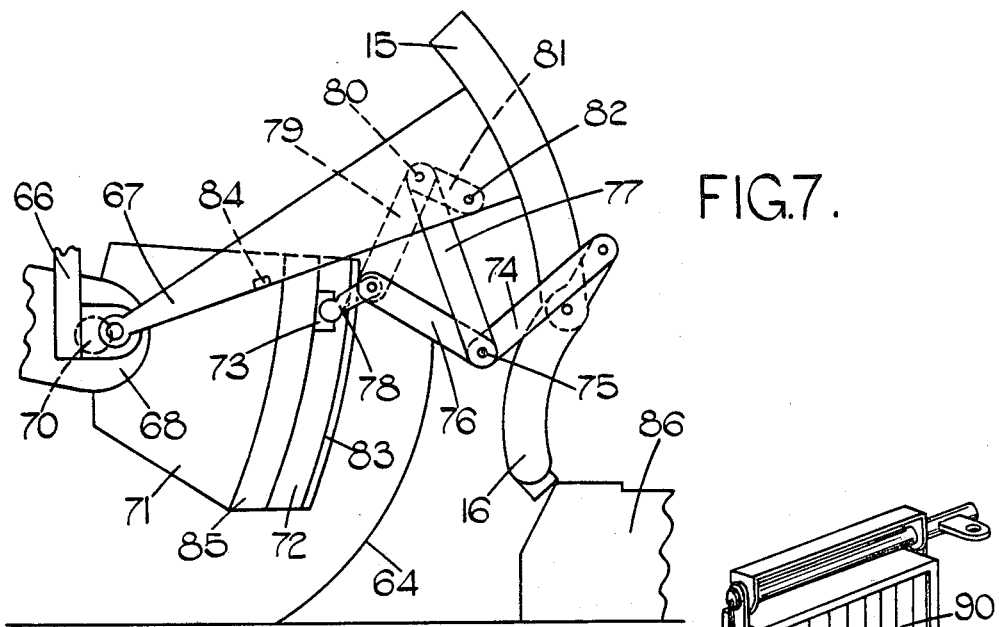
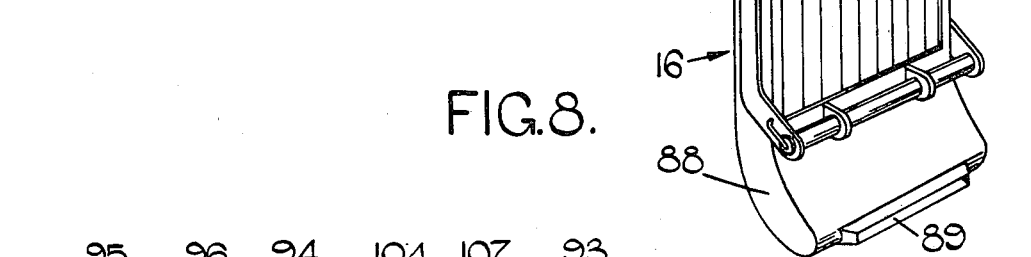
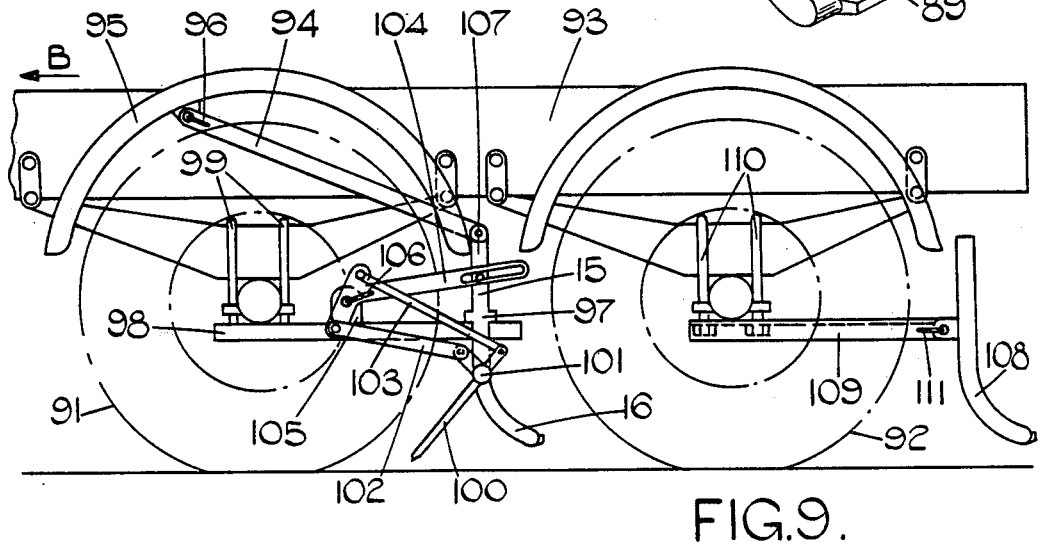

U.S. Patent   Dec. 7, 1982   Sheet 5 of 5   4,362,310

SPRAY-INHIBITING MEANS FOR USE ON A ROAD VEHICLE

This invention relates to spray-inhibiting means for use on a road vehicle. The need for such spray-inhibiting means occurs of course when a vehicle is travelling in wet weather and especially if it is travelling in wet weather at high speed as may occur for example on a motorway. In such conditions the vehicle will tend to create a considerable amount of spray which will represent a hazard to other road users and the object of the present invention is to provide improved spray inhibiting means which will inhibit the formation of spray in wet weather.

In accordance with the invention there is provided spray-inhibiting means for a road vehicle comprising a screen which is adapted in use to intercept water thrown rearwardly from a vehicle tyre, and means for mounting said screen on the vehicle in an operative position in which its lower edge lies closely adjacent to the road surface behind the associated vehicle tyre, said mounting means being arranged to maintain the screen in its operative position in normal operating conditions irrespective of the position, measured in a vertical direction, of said associated vehicle tyre relative to the load-carrying part of the vehicle.

The afore-mentioned screen may conveniently comprise an upper portion and a lower portion which is pivotally mounted on the lower part of said upper portion so as to be pivotable relative thereto about a horizontal axis which, when said means is fitted to a vehicle, will extend in a direction parallel to the axis of the associated vehicle tyre. Furthermore, said upper and lower portions of the screen may be connected together by a linkage which will permit the lower portion to pivot relative to the upper portion in one direction of rotation if for example said lower portion engages an obstruction on the road surface or which alternatively will cause the whole screen to move temporarily upwards if said lower portion encounters a force (which may for example be applied by another obstruction or by a kerb-stone) which tends to rotate the lower portion relative to the upper portion in the opposite direction of rotation.

Figure 2:
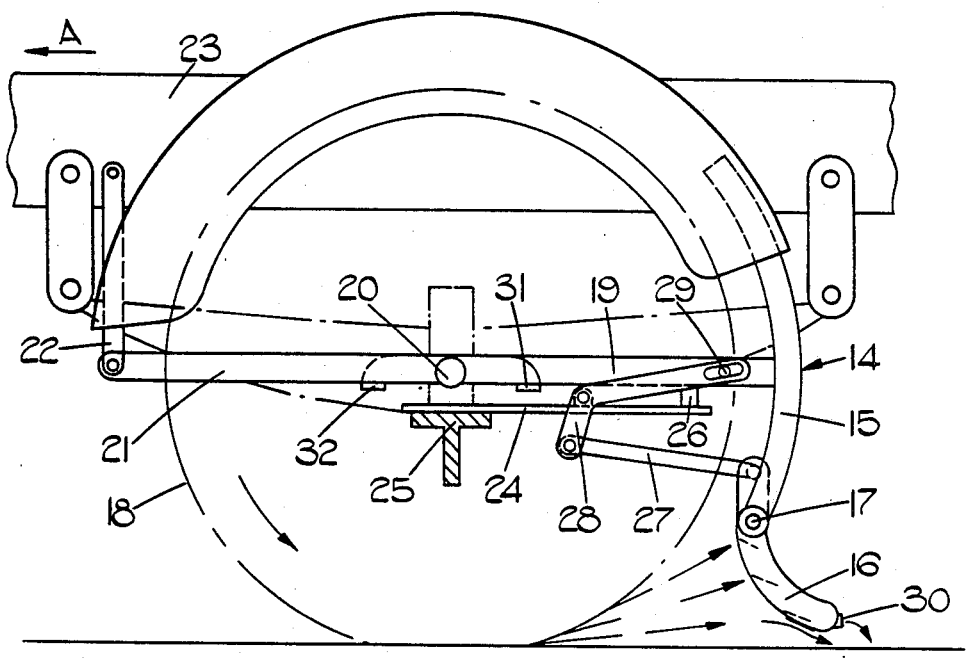
Figure 3:
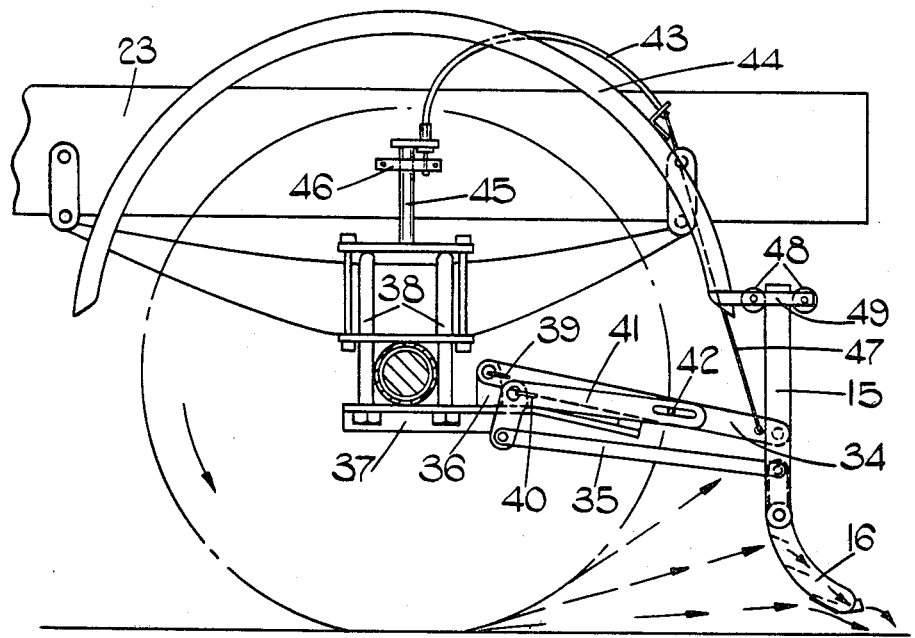
Figure 4:
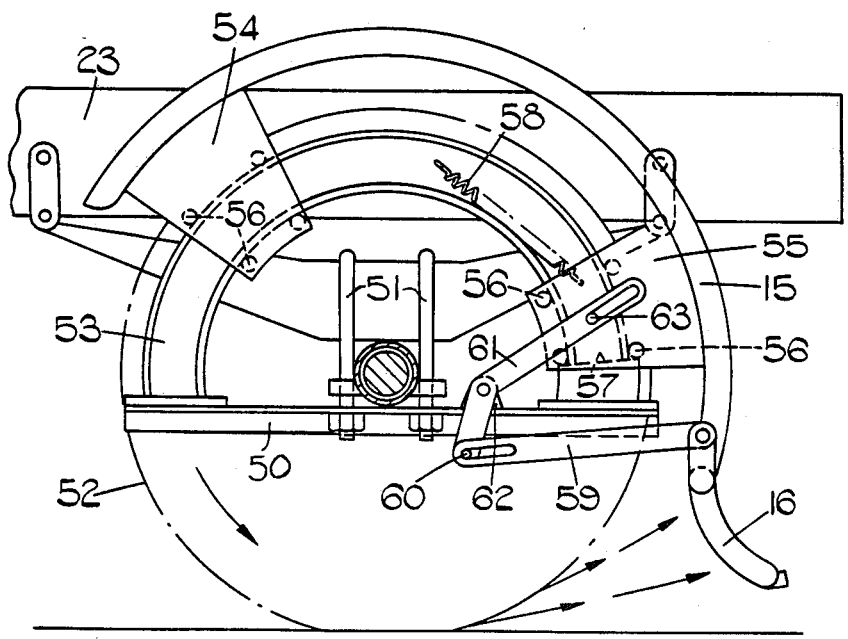
Figure 5:
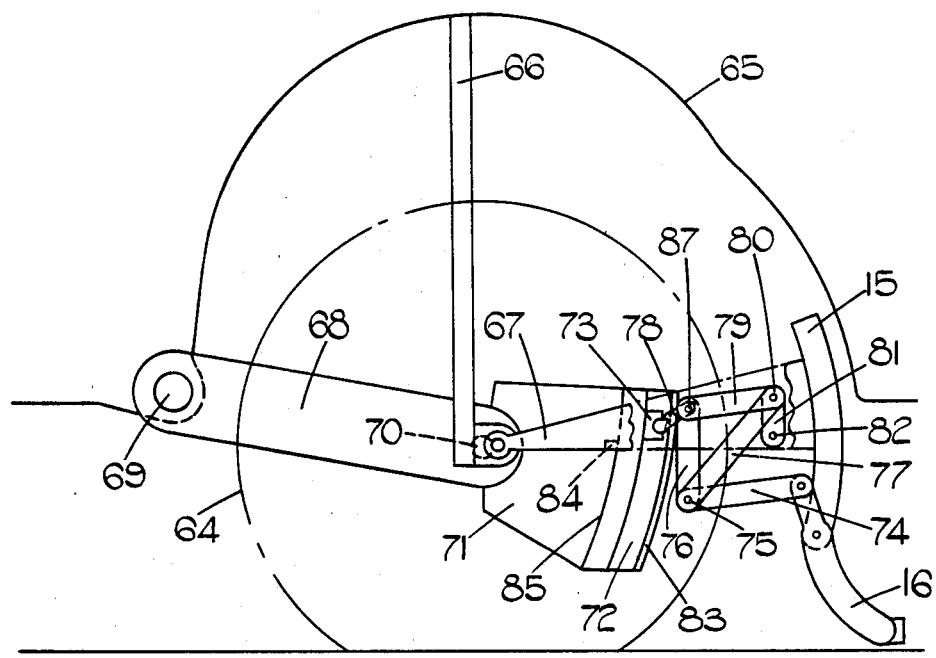
Figure 6:
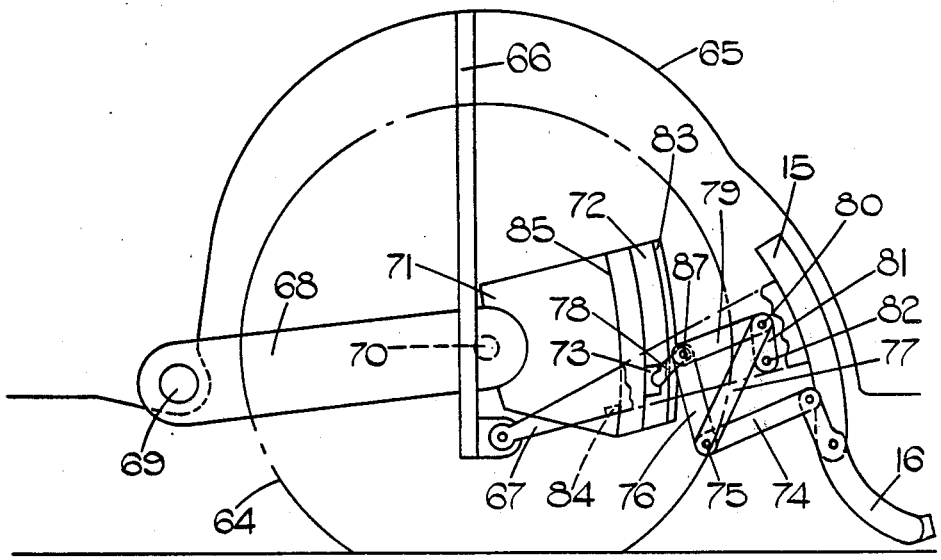
Figure 10:
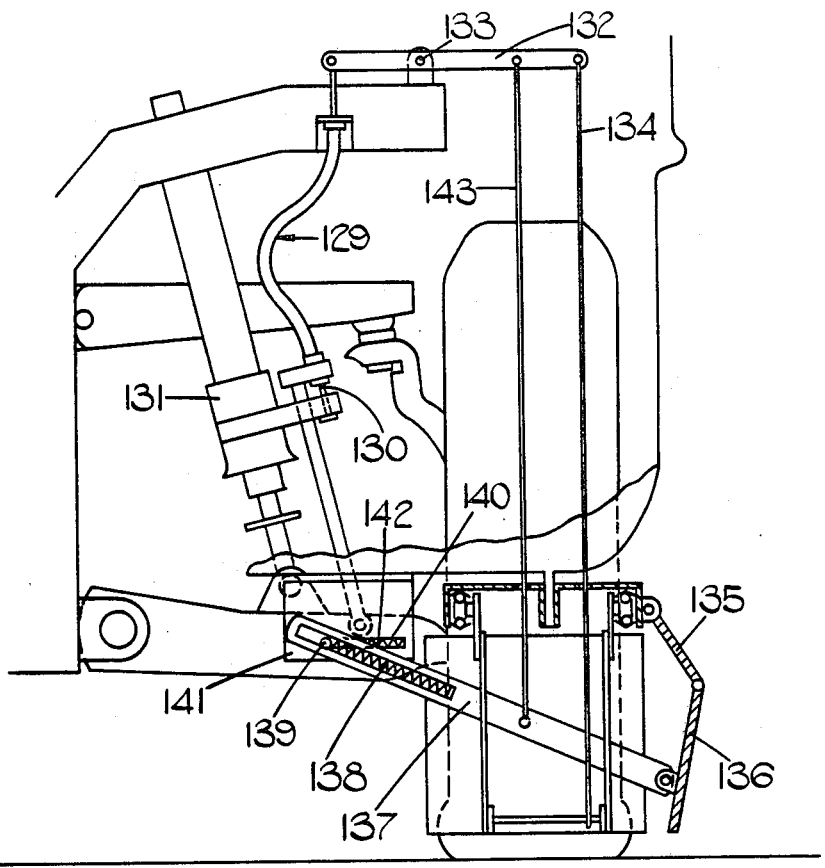
Figure 11:
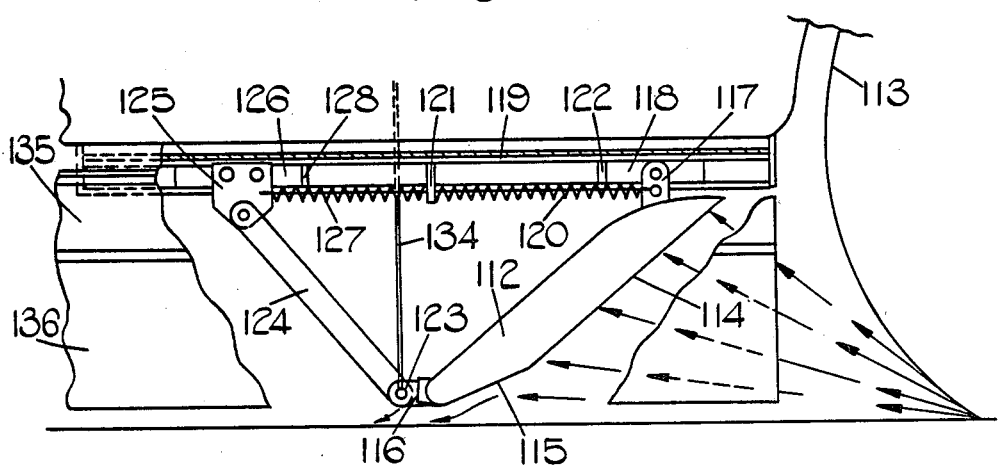

The invention will now be more particularly described with reference to the accompanying drawings wherein FIG. 1 is a side view of two alternative embodiments of spray-inhibiting means constructed in accordance with the invention, said embodiments being respectively shown as being fitted to the front and rear wheels of a road vehicle, FIG. 2 is an enlarged side view of the embodiment which is fitted to the front wheel of the vehicle seen in FIG. 1, FIG. 3 is an enlarged side view of the embodiment which is fitted to the rear wheel of the vehicle seen in FIG. 1, FIG. 4 is a side view of an alternative embodiment of spray-inhibiting means in accordance with the invention, FIGS. 5, 6 and 7 are respectively two side views showing alternative positions of a further embodiment of spray-inhibiting means in accordance with the invention, and a partial side view showing the same embodiment in a further alternative position, FIG. 8 is a perspective view of one example of a screen that can be used in spray-inhibiting means in accordance with the invention, FIG. 9 is a side view showing a twin rear wheel unit of a road vehicle fitted respectively with two further examples of spray-inhibiting means in accordance with the invention, and FIGS. 10 and 11 are respectively end and side views of yet another example of spray-inhibiting means in accordance with the invention.

Referring now to the drawings FIG. 1 shows in side view a vehicle 10 having a pair of front wheels of which one, indicated by reference numeral 11, is seen and a pair of rear wheels of which one is indicated by reference numeral 12, each of said wheels having a tyre which, in wet conditions may give rise to the formation of spray which is caused by water being flung rearwardly by said tyre. It is incidentally to be understood that the expression "tyre" is intended to cover also a construction in which a wheel unit of the vehicle comprises two or more tyres mounted in a side-by-side relation on a common hub or axle.

The tyre associated with a front wheel 11 is fitted with spray-inhibiting means generally indicated by reference numeral 13 in FIG. 1 but shown in more detail in FIG. 2. This said means comprises a screen 14 which comprises an upper portion 15 and a lower portion 16 which is pivotally mounted on the lower part of said upper portion 15 so as to be pivotable relative thereto about a horizontal axis 17 which will extend in a direction parallel to the axis of the associated tyre indicated in FIG. 2 by reference numeral 18. The upper portion 15 of the screen is connected to a forwardly extending lever 19 which is pivoted on a horizontal axis 20 coincident with the axis of said tyre 18 and on said axis 20 is also pivoted a further lever 21 which at its forward end is connected to a vertically disposed link 22 connected at its upper end to the load carrying part of the vehicle such as a platform or chassis 23. A bar 24 extends rearwardly from a fixed support 25, the rear end of said bar having an upwardly projecting stop 26. Furthermore there is provided a linkage which interconnects said upper portion 15 and said lower portion 16 of the screen, said linkage comprising an arm 27 and a bell crank lever 28 which is pivotally mounted on a bracket projecting upwardly from the bar 24 and which has a pin and slot connection 29 with the lever 19.

The aforesaid screen comprising the upper and lower portions 15 and 16 is designed to intercept water and spray flung rearwardly from the tyre 18 when the vehicle is in motion and said upper portion 15 may include a plurality of generally vertically extending baffles which are arranged to intercept water in said spray whilst permitting air to pass between the baffles, the intercepted water running downwardly towards and into the lower portion 16 which may be of hollow construction and which is provided with a rearwardly directed water outlet 30 arranged to discharge water rearwardly and preferably at a velocity relative to the vehicle velocity that such discharged water will have no or only a low velocity in a horizontal direction relative to the road surface itself as is more particularly explained for example in our prior Patent Application No. 2004823A. As will be seen from FIG. 2 the water outlet 30 is disposed adjacent to the road surface so as to present only a small gap between the bottom of the screen and the road surface and the lower surface of said portion 16 is shaped so that it is of forwardly convex configuration and is thereby adapted to direct a jet of water which may originate from the lowermost part of the tyre 18 with the minimum of disturbance beneath the screen. It is however important that said lower portion 16 should be maintained at all times in an operative position in which said water outlet 30 is disposed closely adjacent to the road surface, irrespective of the loading of the vehicle. In the case of the construction shown in FIG. 2 therefore if the platform or chassis 23 of the vehicle is loaded said platform or chassis will move downwardly and will thus move the link 22 downwardly which will cause the lever 21 to rotate about the axis 20 in an anti-clockwise direction and by virtue of a projection 31 connected to the lever 21 and passing beneath the lever 19 will lift the latter so that it pivots also in an anti-clockwise direction on the axis 20 and will thereby lift the screen 15, 16 to compensate for the downward movement of the platform or chassis 23. On the other hand if the tyre 18 passes over an obstruction lying on the road surface whilst the vehicle is travelling in a forward direction as indicated by arrow 'A' in FIG. 2 engagement of the obstruction by said lower portion 16 will have the effect of lifting the screen 15, 16, the pin and slot connection 29 permitting the bell crank lever 28 to turn on its pivot during such lifting movement until, when the obstruction has been passed, the screen 15, 16 can fall again until the lever 19 engages the stop 26. Alternatively if the vehicle is being reversed and the rear side of the lower portion 16 of the screen meets another obstruction such as may be provided for example by a kerb-stone then the lower portion 16 will tend to pivot relative to the upper portion 15 about the axis 17 in a clockwise direction and this movement will have the effect of turning the bell crank lever 28 in an anticlockwise direction by virtue of its connection to the arm 27. Said bell crank lever 28 will then again lift the upper portion 15 and with it the lower portion 16 by virtue of the pin and slot connection 29 between said bell crank lever and the lever 19 until the vehicle again disengages said obstruction when the screen will be able to fall back to its operative position in which the lever 19 engages the stop 26. In the upward movement of said screen caused by pivotal movement of the lever 19 in an anti-clockwise direction as aforementioned a further projection 32 connected to said lever 19 and passing beneath the lever 21 will move away from said lever 21 but when the screen returns to its operative position said projection 32 will engage the lever 21 to cause pivoting of the lever 19 in a clockwise direction to lower the screen if subsequently the load on the platform or chassis 23 is decreased, thus allowing said platform or chassis to rise.

FIG. 3 shows in greater detail an alternative spray-inhibiting means which is applied to the tyre mounted on wheel 12 and indicated generally by reference numeral 33 in FIG. 1. In this construction the screen comprising upper portion 15 and pivotally mounted lower portion 16 is pivotally connected to a pair of arms 34 and 35, arm 34 being pivotally connected to the upper portion 15 and arm 35 being pivotally connected to the upper part of lower portion 16. The forward end of arm 34 is pivotally connected to a bracket 36 mounted on a bar 37 which is fixed to the underside of spring shackles 38 and a torsion spring 39 together with a further torsion spring 40 which acts on a bell crank lever 41 also pivotally mounted on a bracket connected to the bar 37 acts to set said screen 15, 16 in its desired operative position. One end of said bell crank lever 41 is pivotally connected to the forward end of said arm 35 and the other end of said bell crank lever 41 has a pin and slot connection 42 with the arm 34. In addition there is provided a flexible cable such as a Bowden cable having an outer component 43 which is secured at its ends respectively to a mudguard 44 and a stem 45 extending upwardly from the spring shackle assembly, said stem 45 extending freely through a hole formed in a plate 46 which is connected to the platform or chassis 23 of the vehicle. The inner wire 47 of said Bowden cable is connected at its two ends respectively to the arm 34 and to said plate 46 so that if said plate 46 moves vertically downwardly because of an increase in the load on said platform or chassis 23 then the arm 34 will act to pull the screen 15, 16 upwardly, the upper part of said upper portion 15 extending between guide rollers 48 mounted on a rearwardly projecting support 49 which is secured to said mudguard 44. The screen 15, 16 will thus be maintained in a substantially constant operative position irrespective of the loading on said platform or chassis 23. On the other hand if the lower portion 16 meets an obstruction whilst the vehicle is travelling in a forward direction then the whole screen 15, 16 will move upwardly until said lower portion 16 has ridden over the obstruction, the aforesaid pin and slot connection 42 between the bell crank lever 41 and the arm 34 permitting rotation of said bell crank lever during such upward movement of the screen. If however the rearside of the lower portion 16 of the screen engages an obstruction such as a kerb-stone whilst the vehicle is being reversed then the tendency of said lower portion 16 to pivot relative to the upper portion 15 in a clockwise direction will cause operation of said linkage represented by the arm 35 and the bell crank lever 41 to turn the latter on its pivot in an anti-clockwise direction and thereby again cause lifting of the arm 34 through the pin and slot connection 42 so as to lift the screen 15, 16, the upper part of said portion 16 extending upwardly through the rollers 48.

FIG. 4 shows yet another alternative form of spray-inhibiting means constructed in accordance with the present invention and in this case there is a bar 50 which is secured to the spring shackle assembly 51 so as to project both forwardly and rearwardly of the axis of the tyre 52, said bar 50 being disposed below the axle of the wheel on which said tyre is mounted. Connected to the bar 50 so as to be fixed relative thereto is a track 53 of generally semi-circular configuration and the upper portion 15 of the screen is provided with carriage means in the form of a pair of inwardly directed carriages 54 and 55 which are each provided with rollers 56 engaging said track 53. In the operative position of said screen 15, 16 the lowermost rollers 56 of the carriage 55 engages a stop surface 57 and a spring 58 interconnected between the track 53 and said carriage 55 so as to balance at least a part of the weight of the screen 15, 16 and its connected parts.

There is also provided a linkage interconnecting said upper portion 15 and said lower portion 16 of the screen, said linkage comprising an arm 59 connected by a pin and slot connection 60 to a bell crank lever 61 pivotally mounted on a bracket 62 connected to the bar 50, said bell crank lever 61 having a pin and slot connection 63 at its upper end with the carriage 55. Since the screen 15, 16 is carried by the fixed bar 50 no compensation is required to maintain the operative position of said screen even though the load on the platform or chassis 23 may vary. However engagement of the forward side of the lower portion 16 with an obstruction lying on the road will cause the whole screen 15 and 16 to lift so that the carriages 54 and 55 will travel round the track, said pin and slot connections 60 and 63 permitting such upward movement of the screen 15, 16, until the obstruction has been passed whereupon the screen will fall back to the position in which said lowermost rollers 56 of the carriage 55 engage the stop surface 57. Similarly if the rearside of said lower portion 16 engages an obstruction as the vehicle is being reversed the linkage comprising said arm 59 and bell crank lever 61 will be actuated to cause again lifting movement of the screen 15, 16 so that the carriages 54 and 55 will again move temporarily round the track 53.

FIGS. 5, 6 and 7 show yet a further alternative embodiment of spray-inhibiting means constructed in accordance with the present invention and this embodiment is intended for use where the wheel of an associated tyre 64 is supported by independent suspension as opposed for example to a beam axle which may be utilized in the previously described construction. In the embodiment shown in FIGS. 5, 6 and 7 the body of the vehicle concerned is indicated by reference numeral 65 and said body has a downwardly depending link 66 which at its lower end serves to provide a pivot for the forward end of a member 67 which is connected at its rearward end to the upper portion 15 of the screen, the latter including also a pivotally mounted lower portion 16 as before. There is also provided a suspension link 68 pivoted at its forward end 69 to the body 65 of the vehicle, said suspension link 68 being pivoted at its rearward end 70 to the pivotal axis of the wheel carrying said tyre 64 and said link 68 is formed with a rearwardly projecting extension 71 at the rearward end of which is formed a guide track 72 in which slides a block 73 which is connected to a linkage interconnecting said upper and lower portions 15, 16 of the screen. Said linkage comprises a link 74 which is pivotally connected at one end to an upward extension of said lower portion of the screen 16 and at the other end about pivot 75 to one end of a link 76 and one end of another link 77. The upper end of said link 76 is pivotally connected to one end of a short link 78 and also to one end of another link 79 which is itself pivotally connected at its other end to the upper end of link 77 and the common pivot 80 is also used to pivotally connect the upper end of another link 81 which is pivoted at 82 to the member 67. The link 78 is connected to the sliding block 73 and is also formed with a pair of lateral projections which are arranged to straddle a laterally projecting rib 83 formed on the part 71.

In the view shown in FIG. 5 the vehicle is relatively lightly loaded so that the link 66 is in a relatively upper position whilst the suspension link 68 is inclined rearwardly and downwardly and in these positions of said links the sliding block 73 is positioned somewhat towards the upper end of the track 72 formed in the part 71 so that said member 67 holds the upper portion 15 and with it the lower portion 16 in the desired operative position. If however the vehicle body 65 is loaded the link 66 will be depressed and the suspension link 68 will assume an alternative orientation in which it is inclined rearwardly and upwardly and in this condition the sliding block 73 will move downwardly relative to the track 72 formed in the part 71 and the aforesaid linkage will still maintain the screen 15, 16 in the desired operative position. Said operative position will be determined by the engagement of a stop 84 provided on the member 67 with a laterally projecting surface indicated by reference numeral 85 formed on the part 71, the shape of such surface 85 being arranged such that when the stop 84 engages said surface the screen 15, 16 will always be in its desired operative position. If however the forward side of said lower portion 16 meets an obstruction then the aforesaid linkage will act to permit the member 67 to pivot in an anti-clockwise direction on its pivot at the bottom of said link 66 so that the screen 15, 16 will be lifted until the obstruction has been passed. Alternatively if the vehicle is reversed to cause the rear side of said lower portion 16 to engage a kerb-stone as indicated by reference numeral 86 in FIG. 7 the tendency of the lower portion 16 to pivot in a clockwise direction relative to the upper portion 15 will cause the various links of said linkage to assume the position shown in FIG. 7 and in this position the aforesaid lateral projections of the link 78 which straddle the rib 83 will be caused to engage the opposite sides of said rib because of an anti-clockwise turning of said link 78 and thus the pivot 87 will remain in a stationary position and this will then permit the links of said linkage to assume the position shown in FIG. 7 in which the upper and lower portions 15 and 16 of the screen have been lifted relative to the operative position of the screen. As previously indicated the pivot 82 of said linkage is connected to the member 67 but the pivot 80 is not connected to said member.

FIG. 8 is a perspective view showing in more detail one example of a lower portion 16 of the screen, said example comprising a bottom part 88 which is of hollow box-like form having a water outlet 89 and a top part which includes a plurality of generally vertically extending baffles 90, the arrangement being such that water from spray impinging on said baffles will be intercepted thereby and will then run down into the hollow box-like part 88 and thence through the water outlet 89 whereas air from said spray will pass between the baffles 90 to the rearward side thereof.

FIG. 9 illustrates two further alternative embodiments of spray-inhibiting means constructed in accordance with the invention, these embodiments being shown, for purposes of illustration only, as applied to two rear mounted vehicle tyres indicated by reference numerals 91 and 92. The vehicle has a load supporting platform or chassis 93 and its forward direction of motion is indicated by arrow 'B'. Disposed to the rear of the forward of the two tyres namely tyre 91 is a screen having a lower portion 16 which is pivotally connected to an upper portion 15 which in turn is pivotally connected at its upper end to a supporting arm 94, the latter being pivotally connected at its upper end to a mudguard 95, said pivot between the arm 94 and the mudguard 95 incorporating a torsion spring 96 which tends to urge the arm 94 in a clockwise direction, thereby urging the screen 15, 16 downwardly until stops 97 connected to said portion 15 engage a fixed longitudinal member 98 which is secured to the spring shackle assembly 99 and which extends rearwardly therefrom. Irrespective of the relative height of said platform or chassis 93 (which height depends on the loading thereof) the torsion spring 96 will therefore urge the screen 15, 16 into a position in which said stop 97 engage the bar 98 so that the screen 15, 16 will be maintained at a constant operative position relative to the road surface in normal operating conditions.

There is however provided a guard 100 which may conveniently be formed by a series of interconnected spaced parallel tines, said guard being pivotally mounted about the same axis namely axis 101 which forms the pivotal axis between portion 15 and portion 16 of the screen. The screen portion 16 is extended upwardly beyond said pivotal axis 101 and is pivotally connected to a link 102 whilst the guard 100 also extends upwardly beyond said pivotal axis 101 and is pivotally connected to a link 103. There is also provided a generally T-shaped lever 104 which is pivotally mounted on an upstanding bracket 105 which is connected to said bar 98, the pivot incorporating a torsion spring 106 which tends to urge said T-shaped lever 104 in a generally clockwise direction on its pivot. The upper ends of said links 102 and 103 are connected to the T-shaped lever 104 as shown and said lever also has a pin and slot connection 107 with said upper portion 15 of the screen. If therefore the tyre 91 passes over an obstruction whilst the vehicle is travelling in a forward direction such obstruction will engage the forward side of the guard 100 which will have the effect of pivoting said guard about the axis 101 so that the lower part of the guard moves towards the screen 16 in a scissor-like movement. Such movement will actuate the links 102 and 103 which will then turn the T-shaped lever 104 on its pivot so that the pin and slot connection 107 will act to lift the screen 15, 16. Similarly if the vehicle is reversed to a position where the rearside of said lower portion 16 engages an obstruction such as a kerb-stone then again a closing, scissor-like, movement of the lower part of the guard 100 and the portion 16 will again result in an anti-clockwise pivoting movement of the T-shaped lever 104 which will thus lift the screen 15, 16. Once an obstruction has been passed or removed the torsion springs 96 and 106 acting respectively on the arm 94 and the T-shaped lever 104 will act to return said screen 15, 16 to its lower or operative position.

The right-hand side of FIG. 9 shows an alternative simplified arrangement in which a screen, indicated by reference numeral 108 is pivotally connected to the rearward end of a horizontal longitudinally extending bar 109 which is secured to the spring shackle assembly 110 of the wheel on which the tyre 92 is mounted. The pivot between said screen 108 and the bar 109 conveniently includes a torsion spring 111 arranged so that said screen 108 can in fact pivot in either a clockwise or anti-clockwise direction relative to the bar 109 should said screen meet an obstruction on either its front or rearward side, the torsion spring 111 serving to return the screen 108 to the position shown in the drawing when the obstruction has been passed or removed. The screen 108 as shown is in one piece but if desired it may be formed of a lower portion and an upper portion pivotally connected together as previously described. Whichever construction is adopted however it will be appreciated that the screen, being mounted on the fixed bar 109, will maintain the desired operative position in which the bottom of the screen lies closely adjacent to the road surface and at a predetermined distance therefrom irrespective of the loading on the platform or chassis 93.

Referring now to the embodiment shown in FIGS. 10 and 11 there is provided a screen 112 which as shown is mounted for example to the rear of a front tyre 113 of a motor car, said screen being of generally hollow formation provided with openings in the upper part 114 of its forward facing surface and a deflector plate 115 in the lower part of said surface. Thus spray flung rearwardly from the vehicle tyre 113 will enter the hollow screen 112 via the openings in said part 114 and will thereafter be discharged from an outlet 116, the horizontal velocity of such discharge relative to the road surface being arranged to be substantially less than the forward horizontal velocity of the vehicle. The lowermost part of the spray or water flung rearwardly from the tyre 113 will impinge on the deflector plate 115 and will then be directed rearwardly beneath the screen.

The upper part of said screen 112 is provided with an upwardly projecting bracket 117 which is pivotally connected to a block 118 which slides in a rail 119, said bracket 117 being connected to one end of a tension spring 120 which is connected at its other end to an abutment 121. The rail 119 has a stop 122 and in normal operating conditions the spring 120 will pull the block 118 into engagement with the stop 122. The lower end of said screen 112 is also provided with a bracket 123 which is pivotally connected to a link 124 connected at its upper end to a plate 125 which is connected to a block 126 which is also slidable along the rail 119. The plate 125 is connected to one end of a further tension spring 127 which is also connected to said abutment 121 and there is provided a further stop 128 which, in normal operating conditions as shown in FIG. 11 serves to engage the leading end of said block 126. Thus in the position shown in FIG. 11 the blocks 118 and 126 are in engagement respectively with the adjacent stops 122 and 128 but if either the screen 112 or the link 124 meet an obstruction then one or both of the tension springs 120 and 127 will allow movement of one or both blocks 118 and 126 away from their respective stops to permit the screen 112 or link 124 to ride over the obstruction.

There is also provided a flexible cable such as a Bowden cable indicated in FIG. 10 by reference numeral 129 which is used to maintain said screen 112 at a constant height relative to the road surface irrespective of the loading of the car. Thus said flexible cable 129 includes an inner member 130 which at its lower end is connected to a part of the front suspension 131 of the motor car so that if for example said suspension part is depressed consequent upon loading of the motor car then the inner part 130 of said flexible cable will be moved downwardly and this in turn will pivot a lever 132 in an anti-clockwise direction about its pivot 133, one end of said lever being connected to the inner part 130. The other end of said lever is connected to a cable 134 which is connected at its lower end to the bottom of said link 124 so that anti-clockwise pivoting of the lever 132 will lift the cable 134 and thus lift the screen 112 to compensate for the downward movement of the body of the motor car.

There is in addition, in the embodiment shown in FIGS. 10 and 11, a side screen comprising an upper part 135 which is pivotally connected to a lower part 136, said side screen extending in a direction which is generally parallel to the longitudinal axis of the motor car and which conveniently extends between the front and rear wheels of the vehicle, there being provided a side screen on each side of the car. The lower part 136 of said side screen is pivotally connected to an arm 137 having a slot in which is mounted a spring 138 which bears on a peg 139 projecting into said slot and connected to a block (not shown), which slides in a further slot 140 formed in a plate 141, said block being engaged by a further spring 142 mounted in the slot 140. Said springs 138 and 142 will enable said side screen to move inwardly should its outer surface come into contact with an obstruction and furthermore said arm 137 is connected to the lower end of a further cable 143 which at its upper end is attached to the lever 132 and thus any anti-clockwise pivoting of said lever 132 consequent upon loading of the car will have the effect of lifting the side screen 135 and 136 as well as the screen 112 in order to compensate for the loading and maintain both screens in operative positions in which their bottom surfaces are disposed at a predetermined height above the road surface.

The side screens act to prevent cross winds from blowing beneath the car and forming spray underneath it, such spray then being distributed around the car in the general air turbulence but if desired each side screen 135, 136 may be provided with a plurality of small perforations which will prevent an undesirably large decrease in the air pressure beneath the car, such perforations being so arranged however as not to permit the escape of an unacceptably large amount of spray from the sides of the car in wet conditions.

Furthermore, each side screen may be positioned laterally inwardly instead of, as shown, laterally outwardly, of the adjacent tyres and a similar elongate screen may be positioned across and beneath the front end of the car or other vehicle, such front screen being connected to a flexible cable in a manner similar to that described above in connection with the side screen 135, 136.

Also modifications may be made to the construction shown in the left hand side of FIG. 9. In one modification, the pivotally mounted supporting arm 94 is dispensed with and said mudguard 95 is divided into two hingedly connected portions, namely a forward portion and a rear portion, the upper portion 15 of the screen 15, 16 then being connected to said rear portion of the mudguard which thus forms an upper extension to the screen and which can pivot relative to the forward portion of the mudguard to permit lifting and lowering of the screen as previously explained.

In another modification and where there is room between the upper side of the mudguard 95 and the underside of the load supporting platform, the supporting arm 94 is replaced by a further screen portion which extends between said mudguard and said load supporting platform, said further screen portion being inclined to the horizontal in a downwardly rearwardly direction and being pivotally connected at its upper end to the underside of the load supporting platform or a part connected thereto and at its lower end to the upper end of said upper portion 15 or an extension thereof. Said further screen portion can thus pivot to accommodate lifting and lowering of the screen 15, 16 as previously explained.

I claim:

1. Spray-inhibiting means for a road vehicle having a vertically movable load carrying part supported by suspension means including wheel means, said spray-inhibiting means comprising a screen which is adapted in use to intercept water thrown rearwardly from a vehicle tyre, support means for mounting said screen on the vehicle in a manner so that said screen and said load carrying part can move vertically relative to each other, said support means including linkage means connecting said screen with both said suspension means and said load carrying part said screen being connected pivotally through said linkage means to said suspension means and to said load carrying part, said linkage means being responsive to vertical movement of said load carrying part to correspondingly vertically move said screen so as to maintain said screen at a relatively fixed distance from the road surface during said vertical movement of said load carrying part.

2. Spray-inhibiting means as claimed in claim 1 wherein said screen comprises an upper portion and a lower portion which is pivotally secured on the lower part of said upper portion so as to be pivotable relative thereto about a horizontal axis.

3. Spray-inhibiting means as claimed in claim 2 wherein said upper and lower portions of the screen are linked together so that both said portions of the screen move temporarily upwards if said lower portion engages an obstruction on the road surface.

4. Spray-inhibiting means as claimed in claim 2 wherein the screen also includes a guard which is mounted so as to be pivotable about the same horizontal axis on which the upper and lower portions of the screen are relatively pivotable, the guard and the upper and lower portions of the screen all being connected together by a linkage arranged so that any relative pivotal movement of the guard and the lower portion of the screen towards each other consequent upon either the guard or the lower portion of the screen engaging an obstruction on the road surface will actuate said last-named linkage to cause the whole screen to be temporarily lifted.

5. Spray-inhibiting means as claimed in claim 4 wherein said guard and said lower portion of the screen each extend above said horizontal axis, said last-named linkage comprising a T-shaped lever and a pair of links which are pivotally connected at one pair of adjacent ends to the upper parts of the guard and lower screen portion respectively and at the other pair of adjacent ends to said T-shaped lever which has a pin-and-slot connection with the screen.

6. Spray-inhibiting means as claimed in claim 1 wherein said linkage means includes lever means which in use is pivotable intermediate its ends on the axle of the vehicle tyre with which said spray-inhibiting means is associated, one end of said lever means being connected to said screen and the other end to a link which is connectible to the load-carrying part of the vehicle.

7. Spray-inhibiting means as claimed in claim 2 wherein said linkage means mounting means comprises a link which is adapted to be connected to the load-carrying part of the vehicle and which is pivotally connected to one end of a member connected at its other end to said screen, there being also provided a suspension link which in use is pivotally connected at its two ends respectively to said load-carrying part of the vehicle and the wheel carrying the vehicle tyre associated with said spray-inhibiting means, said suspension link having a part in which is formed a guide track which serves to receive and guide a member connected to a linkage which is also connected to said screen and said member connected to the screen, said last-named linkage also connecting said upper and lower portions of the screen and permitting the lower screen portion to pivot relative to the upper portion in one direction of rotation whilst acting to cause lifting of both the upper and lower screen portions if a force is applied to said lower screen portions which tends to rotate it relative to the upper portion in the opposite direction of rotation, said member which is guided by the guide track being arranged to move in the guide track when the positions of said link and said suspension link vary because of a change in the loading of the load-carrying part of the vehicle.

8. Spray-inhibiting means for a road vehicle having a vertically movable load carrying part supported by suspension means including wheel means, said spray-inhibiting means comprising a screen which is adapted in use to intercept water thrown rearwardly from a vehicle tyre, support means for mounting said screen on the vehicle in a manner so that said screen and said load carrying part can move vertically relative to each other, said support means including linkage means connecting said screen with both said suspension means and said load carrying part, said screen being connected pivotally through said linkage means to said suspension means, said linkage means including a flexible cable connected between said screen and said load carrying part, said linkage means being responsive to vertical movement of said load carrying part to correspondingly vertically move said screen so as to maintain said screen at a relatively fixed distance from the road surface during said vertical movement of said load carrying part.

9. Spray-inhibiting means as claimed in claim 8 wherein there is provided a further flexible cable connected at one end to the load carrying part of the vehicle and a further screen which is connected to the other end of said further flexible cable and which in use extends in a direction parallel to the longitudinal axis of the vehicle, said further flexible cable being arranged to maintain said further screen at a constant distance from the road surface when the load-carrying part of the vehicle moves vertically.

* * * * *

UNITED STATES PATENT AND TRADEMARK OFFICE
CERTIFICATE OF CORRECTION

PATENT NO. : 4,362,310

DATED : December 7, 1983

INVENTOR(S) : Maurice Goodall

It is certified that error appears in the above-identified patent and that said Letters Patent is hereby corrected as shown below:

Column 9, Line 64  After "part" insert a comma ----,----

Column 10, Line 44  After "linkage means" delete "mounting means"

Signed and Sealed this

Eighth Day of March 1983

[SEAL]

Attest:

GERALD J. MOSSINGHOFF

Attesting Officer  Commissioner of Patents and Trademarks